H. H. DAY.
Making Rubber Fabrics.
No. 25,180. Patented Aug. 23, 1859.
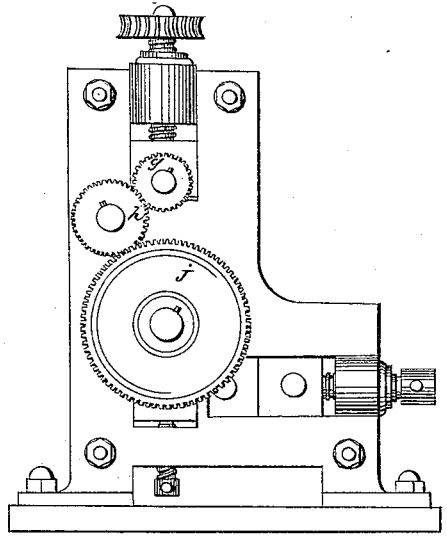
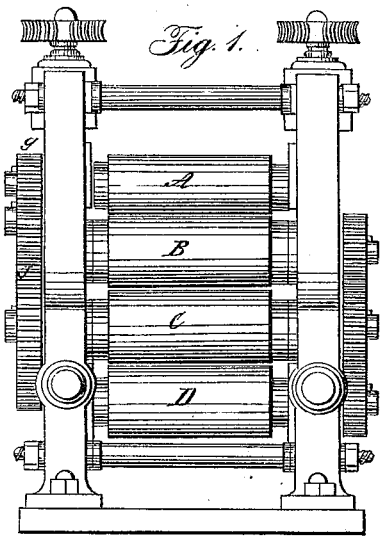
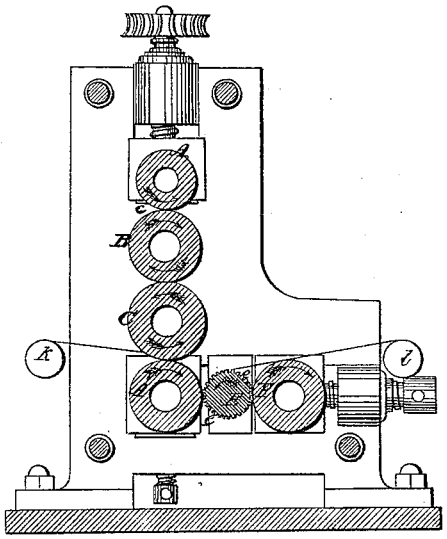
Witnesses:
Inventor:

UNITED STATES PATENT OFFICE.

HORACE H. DAY, OF NEW YORK, N. Y.

MANUFACTURE OF RIBBED ELASTIC CLOTH.

Specification of Letters Patent No. 25,180, dated August 23, 1859.

*To all whom it may concern:*

Be it known that I, HORACE H. DAY, of the city, county, and State of New York, have invented a new and useful Improvement in the Method of Manufacturing Ribbed Elastic Goods, and that the following is a full, clear, and exact description of my invention, reference being had to the accompanying drawing, in which—

Figure 1 represents a front elevation of a calender suitable for manufacturing such goods in the mode invented by me, Fig. 2 is an end elevation of the same, Fig. 3 a vertical transverse section of the same, and Fig. 4 is a view of the fluted roller detached from the calender.

Ribbed elastic goods have hitherto been generally manufactured by covering a series of parallel strands or threads of rubber on both sides with a textile fabric; the strands of rubber being previously prepared for the purpose by a separate and distinct operation, and the covering being either cemented, woven, or sewed upon the previously prepared strands. This mode of manufacture requires that the strands of rubber be previously prepared for the purpose by cutting them from sheets of native gum, or by forming them by cutting or other means from recomposed or from vulcanized gum.

The object of my invention is to enable ribbed elastic goods which contain strands of rubber to be manufactured at a less cost than they can be by the methods heretofore in use; and it consists in effecting the formation of the parallel strands of rubber upon the textile covering with which they are to be permanently attached, so that the previous and separate formation of strands of rubber is dispensed with, and the trouble, care, labor, and complex machinery required to maintain the prepared strands in their proper parallel positions and apply them to the covering are also done away with.

My invention may be carried into effect in various ways, depending upon the nature of the covering of the rubber strands, or upon the construction of the machinery employed, or upon both. I prefer to employ as the textile covering a plain single twilled cloth, and to use the calender represented in the annexed drawing as the machine for effecting the operation.

The calender has six rollers, four of these, A, B, C, D, are arranged one above another, the remaining two E, F, are located at one side of the lowermost roller of the set. The four rollers of this set are plain cylindrical rollers, and are made hollow, as is customary in calenders for spreading rubber and gutta percha upon cloth, so that they may be heated by steam admitted within their barrels. The middle roller E of the lower three is fluted, and the flutes are arranged upon it in helical lines $a$ $a$. The last roller (F) of the series is employed as a sustaining roller, its barrel bearing against that of the small fluted roller and preventing it from yielding to the pressure to which it is subjected. The rollers are geared together by pinions secured to their driving ends, so that they severally revolve in the directions indicated by the arrows upon them in the annexed drawing. The dimensions of the pinions are such that the barrels of the rollers B, C, D, E, F, all revolve at the same speed, and that the barrel of the topmost roller, A, revolves at a different speed from the others; this difference in speed being attained by the relative difference in size in the pinions $g$, $h$, $j$, which communicate motion to this roller from one (C) of the others. The whole series are caused to revolve simultaneously by applying power to them by cog wheels and pinions, in the manner usual in calender rollers for spreading rubber upon cloth.

When vulcanized india rubber is the material of which the elastic strands are to be composed, the gum of which the rubber strands are composed must previously be ground with the customary quantity of sulfur that is required to vulcanize it and the cloth with which it is to be combined should be prepared for the purpose by coating it with a thin sizing of india rubber composition composed of india rubber dissolved in camphene. A mass of the gum, of the putty like consistency which it has when taken from the grinding mill, is applied to the hot calender at the opening $i$ between the uppermost pair of rollers, A, B, so that as they revolve they gradually draw it in between them and reduce it to a sheet; the sheet of gum passes around the second roller B to the space between it and the third roller C, and by the operation of these two is reduced to the thickness required to form the strands. It then passes around the third roller to the space between it and the fourth roller D. As it passes between these two it is applied to one of the covering sheets of cloth, which is fed between these two rollers from a roll of cloth located at one side (*k*) of the calender, so that the sheet of cloth issues from between the rollers, C, D, covered with a thin uniform layer of prepared gum. The gummed sheet of cloth then passes between the fourth roller D and the fluted roller E, and at the same time the second sheet of covering cloth is fed in between these rollers from a roll of cloth located at *l* so that the two sheets of cloth and the gum between them are united by the pressure, while at the same time the ribs of the fluted roller, acting upon the soft putty like layer of gum between the two covering sheets, presses the inclosed gum laterally into the space between the ribs and thus forms it into parallel strands which, when the rollers are at proper distance apart, are connected only by a thin film of gum sufficient to cement the two covering cloths together. The compound cloth thus formed is then vulcanized by heating it in the usual manner and is ready for use.

As the ribs of the fluted roller are formed in helical lines upon it, the strands of rubber formed by them extend diagonally across the cloth, and as cloth is elastic diagonally the compound cloth is found to be sufficiently elastic for many purposes required in the arts. If however a more elastic fabric is required a knitted cloth may be used as the covering material, and as such cloth is elastic in the direction of its breadth the strands of rubber must be formed so as to extend across it; this is effected by using a fluted roller whose ribs extend parallel with its axis instead of at an angle thereto.

In the above described operation, the layer of gum is formed upon one sheet of the covering cloth, the second sheet of covering cloth is applied thereto, the rubber is divided into strands, and the whole united by pressure in one machine having a sufficient number of rollers to effect all these operations; the formation of the layer of gum upon the cloth may however be effected separately in a suitable calender, and it may then be subjected to the remaining operations. In this case the upper three rollers of the vertical set would not be necessary and the three lower rollers would constitute a separate machine, or the combination of the parts of the cloth may be effected by pressure between suitable plates. One of the lower rollers (F) is used only as a sustaining roller to prevent the fluted roller from yielding to the pressure. This sustaining roller would of course be unnecessary if the fluted roller were made of sufficient size and strength to bear the pressure without yielding. It is expedient that the ribbed cloth should frequently have the form of narrow strips having broad unribbed borders; when cloth of this description is required a fluted roller having one or more parts of its barrel unfluted, as at *e e* Figs. 3 and 4, is employed; as these parts act upon the cloth and gum passing between them they press out the surplus gum, leaving only a thin film to cement the two covering sheets together, so that the sheets of compound cloth presents a series of ribs alternating with unribbed parts; the cloth is then cut into strips by dividing it at the central lines of these unribbed parts, so that the strips of ribbed cloth produced have plain unribbed borders.

In describing my invention thus far I have supposed the strands of gum are combined with two sheets of cloth to form the compound fabric; flock may be substituted in place of one of these sheets of cloth by sifting flock upon the bare surface of the layer of gum before it is acted upon by the fluted roller in the place of the second sheet of cloth, and in this case it is expedient to soften the surface of the gum to which the flock is applied by means of some suitable solvent, such for example as camphene; the compound fabric will then consist of a series of strands of gum combined with the cloth upon one side and flock upon the other, the cloth and flock being cemented together between the gum strands by a thin film of gum.

In describing the calender it has been stated that the surface of the uppermost roller revolves at a different speed from the others; the object of this difference in speed is to obtain a sufficient friction upon the gum, or a grinding of it, to expel the air and prevent the formation of blisters.

I deem it proper to state that I do not claim the invention of calender rollers for spreading gum upon cloth and for uniting gum by pressure with cloth, but.

What I claim as my invention and desire to secure by Letters Patent is—

1. The method substantially as herein set forth of manufacturing ribbed elastic cloth; that is to say, elastic cloth containing strands of rubber by forming the strands of rubber upon the covering cloth with which they are to be permanently attached, in contradistinction to forming the strands separately and afterward attaching the covering material to them.

2. I also claim the method substantially as herein set forth of spreading the gum upon the covering cloth and dividing it into strands at one process, so that the two operations are effected simultaneously at different parts of the same apparatus.

HORACE H. DAY.

Witnesses:
FREDERICK C. WAGNER,
W. S. SHATTUCK,
JNO. MORRIS KERR.